(12) United States Patent
Boesen

(10) Patent No.: US 7,203,331 B2
(45) Date of Patent: *Apr. 10, 2007

(54) VOICE COMMUNICATION DEVICE

(75) Inventor: Peter V. Boesen, Des Moines, IA (US)

(73) Assignee: SP Technologies LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/134,239

(22) Filed: Apr. 29, 2002

(65) Prior Publication Data

US 2002/0118852 A1    Aug. 29, 2002

Related U.S. Application Data

(63) Continuation of application No. 09/587,743, filed on Jun. 5, 2000, now Pat. No. 6,408,081, which is a continuation of application No. 09/309,107, filed on May 10, 1999, now Pat. No. 6,094,492.

(51) Int. Cl.
   *H04R 25/00* (2006.01)
(52) U.S. Cl. .................. 381/380; 381/381; 381/328
(58) Field of Classification Search ............... 381/361, 381/312, 314, 320, 321, 313, 315, 326–328, 381/330, 322; 181/130, 135, 129; 380/181, 380/129, 130, 135, 381
   See application file for complete search history.

(56) References Cited

U.S. PATENT DOCUMENTS

| | | | |
|---|---|---|---|
| 3,934,100 A * | 1/1976 | Harada | |
| 4,150,262 A | 4/1979 | Ono | |
| 4,334,315 A | 6/1982 | Ono et al. | |
| 4,375,016 A * | 2/1983 | Harada | 181/135 |
| 4,453,050 A * | 6/1984 | Enokido | 381/381 |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 5,191,602 A | 3/1993 | Regen et al. | |
| 5,201,006 A * | 4/1993 | Weinrich | 381/318 |
| 5,201,007 A | 4/1993 | Ward et al. | |
| 5,280,524 A | 1/1994 | Norris | |

(Continued)

FOREIGN PATENT DOCUMENTS

GB    2 074 817 A    11/1981

OTHER PUBLICATIONS

Air Magic Wireless Headset User Guide.

(Continued)

*Primary Examiner*—Suhan Ni
(74) *Attorney, Agent, or Firm*—McKee, Voorhees & Sease, P.L.C.

(57) ABSTRACT

A voice communication device including an earpiece adapted to be inserted into the external auditory canal of a user is disclosed. The earpiece is smaller than the interior of the external auditory canal and the earpiece does not block the canal. The earpiece includes one or more sensors disposed within the earpiece to sense vibrations. In one embodiment, the earpiece includes a processor disposed within the earpiece and operatively connected to each of the sensors, and a transmitter operatively connected to the processor.

5 Claims, 3 Drawing Sheets

U.S. PATENT DOCUMENTS

| | | | |
|---|---|---|---|
| 5,295,193 A * | 3/1994 | Ono | 381/151 |
| 5,298,692 A | 3/1994 | Ikeda et al. | |
| 5,343,532 A | 8/1994 | Shugart, III | |
| 5,524,056 A * | 6/1996 | Killion et al. | 381/314 |
| 5,606,621 A | 2/1997 | Reiter et al. | |
| 5,613,222 A | 3/1997 | Guenther | |
| 5,692,059 A * | 11/1997 | Kruger | 381/151 |
| 5,721,783 A * | 2/1998 | Anderson | 381/328 |
| 5,771,438 A | 6/1998 | Palermo et al. | |
| 5,802,167 A | 9/1998 | Hong | |
| 5,933,506 A | 8/1999 | Aoki et al. | |
| 5,949,896 A * | 9/1999 | Nageno et al. | |
| 5,987,146 A | 11/1999 | Pluvinage et al. | |
| 6,021,207 A | 2/2000 | Puthuff et al. | |
| 6,048,305 A * | 4/2000 | Bauman et al. | 600/25 |
| 6,094,492 A | 7/2000 | Boesen | |
| 6,112,103 A | 8/2000 | Puthuff | |
| 6,181,801 B1 | 1/2001 | Puthuff et al. | |
| 6,275,596 B1 * | 8/2001 | Fretz et al. | 381/321 |

OTHER PUBLICATIONS

Article enttield "A One-Size Disposable Hearing Aid is Introduced", Wayne J. Staab, Walter Sjursen, David Preves, & Tom Squeglia, pp. 36-41, Apr. 2000.

Article entitled "Brain cancer victim sues cell-phone providers", http://www.cnn.com/2000/TECH/computing/08/08/cellular.cancer.lawsuit.idg/index.html, Aug. 8, 2000.

Article entitled Report Urges Curbs on Mobile Phone Users:, http://www.techweb.com/wire/story/TWB20000515S005, May 15, 2000.

Article entitled "Scientist link eye cancer to mobile phones," by Jonathan Leake, Jan. 14, 2001, http://www.Sunday-times.co.uk/news/pages/sti/2001/01/14/stinwenws01032.html.

Article entitled "The Hearing Review", Jan. 1999, vol. 3: Hearing in Noise (Supplemental), pp. 1-62.

Article entitled "The latest on cell phone emissions".

Article entitled "U.S. Will Oversee Cell-Phone Safety Studies", http://www.techweb.com/wire/story/reuters/REU20000609S0003, Jun. 9, 2000.

Article entitled "What is a Wireless LAN?", 1998, Proxim, Inc.

Article entitled "Wireless Worries: Are Cell Phones a Danger to You and Your Children", http://more.abcnews.go.com/onair/2020/2020_000526_cellphones.html, May 26, 2000.

Bluetooth Usage Model, http://www.bluetooth.com/bluetoothguide/models/ultimate.asp (visited Jun. 26, 2000).

Jawbone Adaptive Headset, http://www.jawbone.com.

* cited by examiner

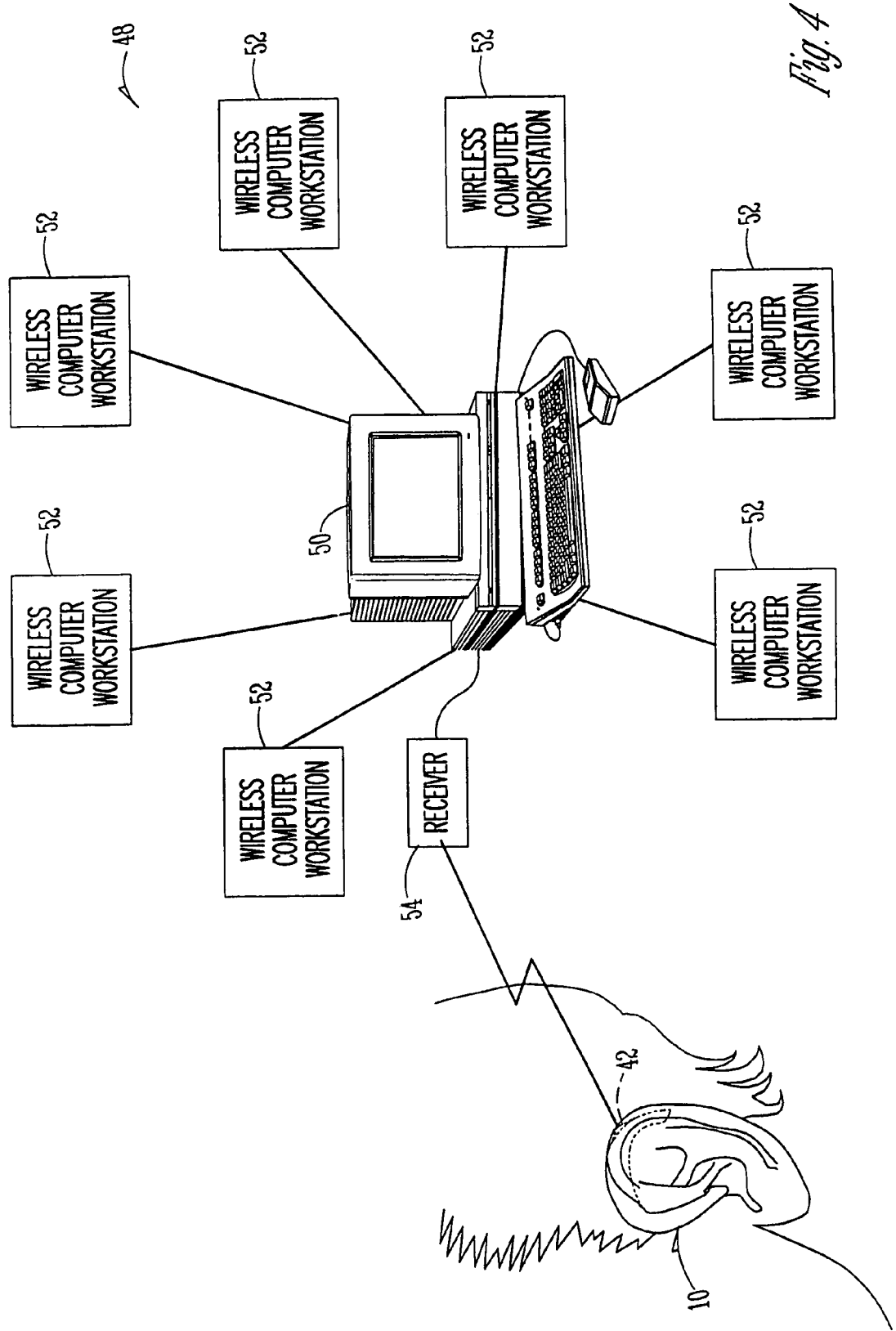

VOICE COMMUNICATION DEVICE

PRIORITY STATEMENT

This application is a continuation of U.S. patent application Ser. No. 09/587,743 filed Jun. 5, 2000 now U.S. Pat. No. 6,408,081 which is a continuation of U.S. Ser. No. 09/309,107 filed May 10, 1999 and issuing as U.S. Pat. No. 6,094,492.

BACKGROUND OF THE INVENTION

1. Field of the Invention

The present invention relates to a voice sound transmitting and receiving apparatus and system. More particularly, though not exclusively, the present invention relates to a voice sound transmitting unit using bone conduction and air conduction to obtain a pure voice sound signal for transmission minimizing interference from the surrounding sound environment.

2. Problems in the Art

Voice sound transmitting and receiving devices are known in the art. However, such devices are limited by the quality of voice signal they are capable of capturing and transmitting. For example, prior art air microphones tend to pick up ambient noise and transmit the same. This is particularly problematic in communications applications that require a pure, unadulterated voice signal. For communications systems to more effectively utilize voice sound as a means of transmitting information, the prior art voice sound transmitting and receiving devices must be capable of producing a much purer voice signal.

One specific communications application area that relies upon a clear voice signal is voice recognition technology. Today, voice recognition software engines are gaining popularity. Such computer software enables a user to, among other things, enter information into a digital record or file directly through speech, obviating the need for a keyboard and other input device. Voice recognition offers numerous advantages when employed as a means of data entry in computer information systems. As but one example, many health care professionals presently dictate patient information onto magnetic tapes that are later transcribed by a third party for entry into a medical records system. A system that could utilize existing voice recognition technology to enter such information into digital records would save time and money. The same hold true for the plethora of other applications that are not presently using voice as a means of data input and communication.

A problem that must be overcome to effectively implement an information or communications system using voice sound is the relative poor quality of voice signal obtained through prior art voice sound transmitting and receiving devices. The efficacy of voice recognition software engines depends upon the quality of the voice signal received. Using prior art air microphones and bone conduction devices often results in data entry errors. Although bone conduction sensors deliver a fairly pure signal, it is generally not the strongest for transmission. An air conduction sensor, on the other hand, will receive a much stronger signal, but alone is not suitable for distinguishing the spoken speech from the multitude of other sounds in the environment. Thus, there is a need in the art for an improved voice sound transmitting unit that is capable of capturing and transmitting a purer and stronger voice signal.

There are also problems in the art concerning the comfort and aesthetic appeal of voice sound transmitting and receiving devices. For example, prior art bone conduction pick up devices, such as those disclosed in U.S. Pat. Nos. 5,295,193 and 4,150,262 to Ono are designed with earpieces that totally obstruct the external auditory canal. Not only are such devices uncomfortable for the user to wear, but they also block air vibrations from entering the auditory canal. In the health care example cited previously, such a device would preclude the user from using a stethoscope while wearing the device. Further, such devices are less aesthetically pleasing to the user. There is therefore also a need in the art for an improved voice sound transmitting unit that does not occlude the external auditory canal, is comfortable to wear for extended periods of time, and is aesthetically pleasing to the user.

Features of the Invention

A general feature of the present invention is the provision of an improved voice sound transmitting and receiving unit which overcomes the problems found in the prior art.

A further feature of the present invention is the provision of a improved voice sound transmitting and receiving unit that captures and transmits a pure voice signal from the user.

A further feature of the present invention is the provision of an improved voice sound transmitting and receiving unit that utilizes both bone conduction and air conduction to transmit an unadulterated voice signal from the user.

A still further feature of the present invention is the provision of an improved voice sound transmitting and receiving unit that is capable for use in wireless communications applications.

A further feature of the present invention is the provision of an improved voice sound transmitting and receiving unit that is comfortable to wear and does not occlude or obstruct the external auditory canal of the user.

A further feature of the present invention is the provision of a voice sound transmitting and receiving unit that permits hands-free communication over a wired or wireless communications linkage.

A further feature of the present invention is the provision of a voice sound transmitting and receiving unit that is aesthetically pleasing to the user.

A still further feature of the present invention is the provision of an improved device for entering voice sound information into a digital record stored on a computer.

A further feature of the present invention is the provision of a device for entering voice sound information into a digital record stored on a computer using a wireless linkage between the voice sound transmitter and the computer.

And a still further feature of the present invention is the provision of an improved method for entering voice sound information into a digital record stored on a computer.

These as well as other features and advantages of the present invention will become apparent from the following specifications and claims.

SUMMARY OF THE INVENTION

The voice sound transmitting unit of the present invention includes an earpiece that is adapted for insertion into the external auditory canal of a user, the earpiece having both a bone conduction sensor and an air conduction sensor. The bone conduction sensor is adapted to contact a portion of the external auditory canal to convert bone vibrations of voice sound information into electrical signals. The air conduction sensor resides within the auditory canal and converts air vibrations of the voice sound information into electrical signals. The voice sound transmitting unit also includes a speech processor and transmitter.

In its preferred form, the speech processor samples the output from the bone conduction sensor and the air conduction sensor. In comparing the sampled output, the speech processor is able to filter noise and select the a pure voice sound signal for transmission. The transmission of the voice sound signal may be through a wireless linkage. In addition, the bone conduction sensor and the air conduction sensor are preferably designed so as not to occlude the external auditory canal. And the voice sound transmitting unit may also be equipped with a speaker and receiver to enable two-way communication.

The present invention also includes a device for entering voice sound information into a digital record stored on computer or computer network. The device includes a voice sound transmitting unit using bone conduction, an interface between the voice sound transmitting unit and the computer or computer network, and a voice recognition software engine adapted to receive and process the voice sound information and convert it into alphanumeric strings to populate the appropriate digital record. The interface is preferably a wireless linkage, such as a radio frequency transmission system.

Finally, the present invention also includes a method of entering voice sound information into a digital record or field stored on a computer or computer system. The method includes selecting the digital record or field on the computer, transmitting voice sound information of the user via a wireless linkage, processing the information using a voice recognition software engine, and populating the digital record or field selected with the voice sound information.

It should be understood that the present invention has wide-ranging applications, not specifically limited to the examples disclosed in this specification. By way of example only, the present invention may be used in data entry, cellular telephone and live music applications.

BRIEF DESCRIPTION OF THE DRAWINGS

FIG. 4 is a diagram of a communications system using the voice sound transmitting unit of the present invention.

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
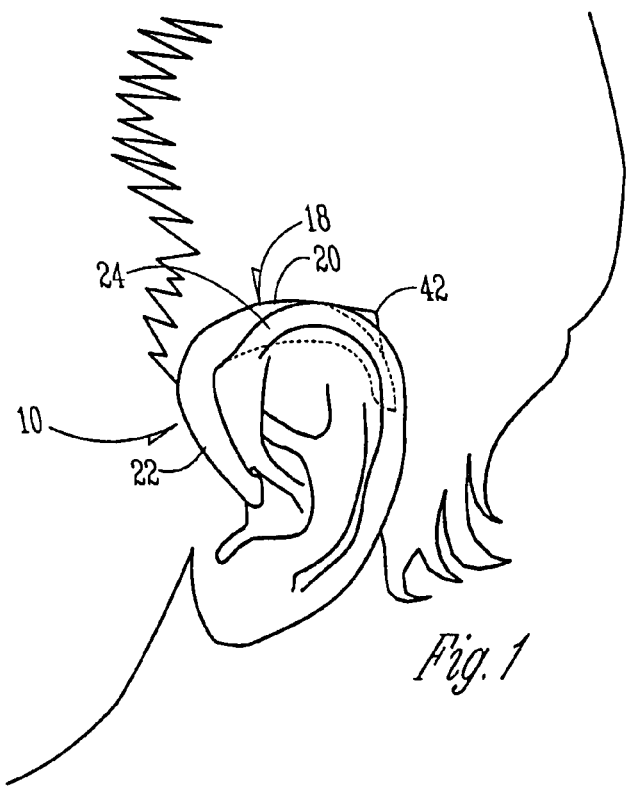
FIG. 1 is a perspective view of the voice sound transmitting unit of the present invention.

Now referring to the drawings, FIG. 1 shows the voice sound transmitting unit 10 of the present invention. The voice sound transmitting unit 10 includes an earpiece 12 having a bone conduction sensor 14 and an air conduction sensor or microphone 16. A casing 18 is also provided, having an ear attachment portion 20 and a fitting portion 22 that connects the ear attachment portion 20 with the bone conduction sensor 14 and the air conduction sensor 16. The ear attachment portion 20 is contoured to fit over and behind the upper ear lobe 24 of the user and is preferably made of a lightweight aluminum or plastic material. It can be appreciated that the primary purpose of the ear attachment portion 20 is to secure the voice sound transmitting unit 10 in proper position. The fitting portion 22 is integral with the ear attachment portion 20 and is reinforced with a flexible wire (not shown) so that the voice sound transmitting unit 10 may be adapted to fit the user and maintain the bone conduction sensor 14 and the air conduction sensor 16 in their proper positions within the external auditory canal 28 of the user.

Figure 2:
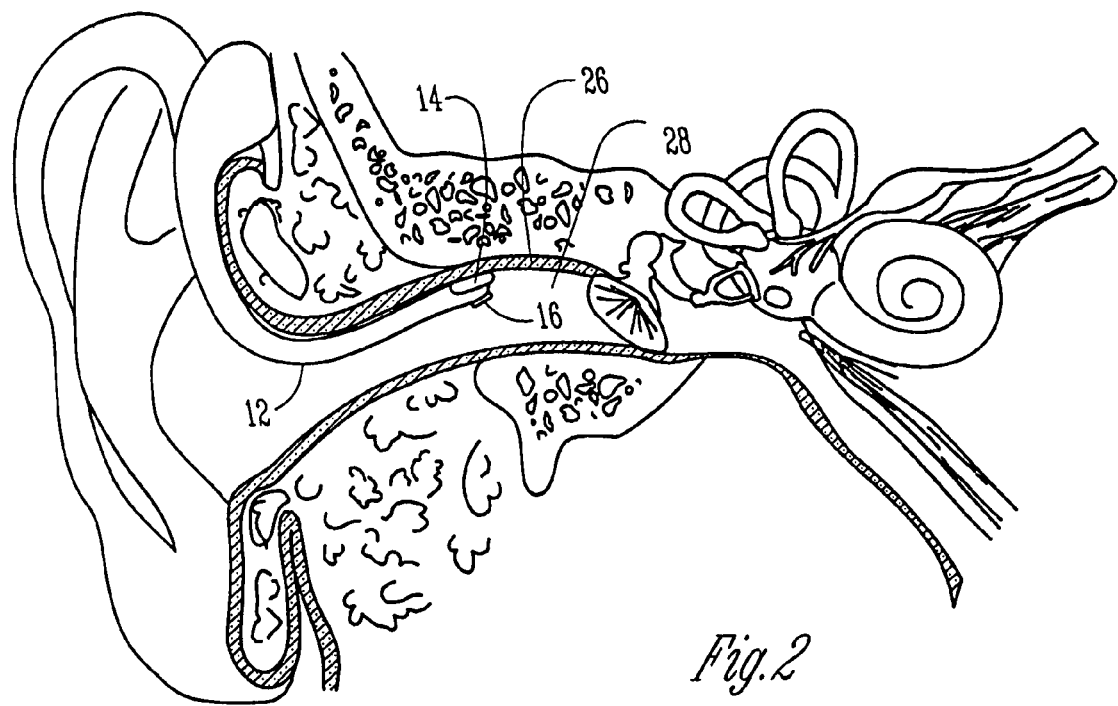
FIG. 2 is a cross-sectional view of the voice sound transmitting unit of FIG. 1 taken through the external auditory canal of the user.

As best shown in FIG. 2, the voice sound transmitting unit should be fit so that the bone conduction sensor 14 is in contact with a portion of the external auditory canal 28. It is preferred that the bone conduction sensor 14 rest against the posterior superior wall of the external auditory canal 28, with the fitting portion 22 shaped to bias the bone conduction sensor 14 into position. Fitting the device and calibrations may be performed by the user or with the assistance of a physician or an audiologist/audiology technician.

The bone conduction sensor 14 is of standard construction and may be obtained from various hearing aid manufactures, including ReSound, Oticon and others. Note that the bone conduction sensor 14 may be of the acceleration type and utilize a piezoelectric pick-up. Other pick-ups that can be used with the present invention, include, but are not limited to, those of the magnetic type, electret condenser type, IC type, and semi-conductor type. All are well-known in the art.

The earpiece 12 is formed so that the bone conduction sensor 14 may be inserted into the external auditory canal 28 of the user and contact against the posterior superior wall 26 of the canal. The bone conduction sensor 14 is intended to pick up, as the voice signals, the vibrations of the upper wall of the external auditory canal 28 at the time of uttering the voice sounds. When the user utters voice sounds, these sounds reach the mastoid bones. These sound vibrations in the external auditory canal portion in contact with the bone sensor 14 are then processed.

In addition to the bone conduction sensor 14, the earpiece 12 also includes an air conduction sensor or microphone 16. Like the bone conduction sensor 14, the air conduction sensor 16 is of standard construction and may be obtained from various manufactures, such as ReSound and Oticon with numerous air microphones which would suffice.

A resilient member (not shown) is preferably positioned between the air conduction sensor 14 and the bone conduction sensor 14 in such a manner that the external sound collected by the air conduction sensor 16 will not be transmitted to the bone conduction sensor 16.

A circuit portion transmits the electrical signals from both the bone conduction sensor 14 and the air conduction sensor 16 to a speech processor 36. The bone conduction sensor 16 and the air conduction sensor 18 are both tuned to receive frequencies within the range of audible human speech, approximately 50 to 8000 Hertz.

The speech processor 36 is of a conventional construction used in many hearing aids and employs a digital processing scheme to package the voice signal for transmission across a wireless linkage. The speech processor 36 will be programmed to extract similarities from air and bone transmission, comparing the similarities in signal and then transmitting via a wireless linkage to a computer or other receiving device. The speech processor 36 also filters out through band pass filters sounds outside the frequency of normal human speech.

The speech processor 36 samples a portion of the electrical signals of voice sound information from the bone conduction sensor 14 and a portion of the electrical signals of voice sound information from the air conduction sensor 16. The speech processor 36 then compares the samples and selects the common voice signal. This common voice signal increases the likelihood that ambient and environmental interference will be minimized.

The speech processor 36 then transmits the selected voice signal to a transmitter 40. The transmitter 40 is preferably a wireless radio frequency transmitter well known in the art that includes a multi-directional antenna 42 (see FIG. 1). Examples are Proxim Corporation's RangeLan 2 or Breezecom radio transmission systems.

Figure 3:
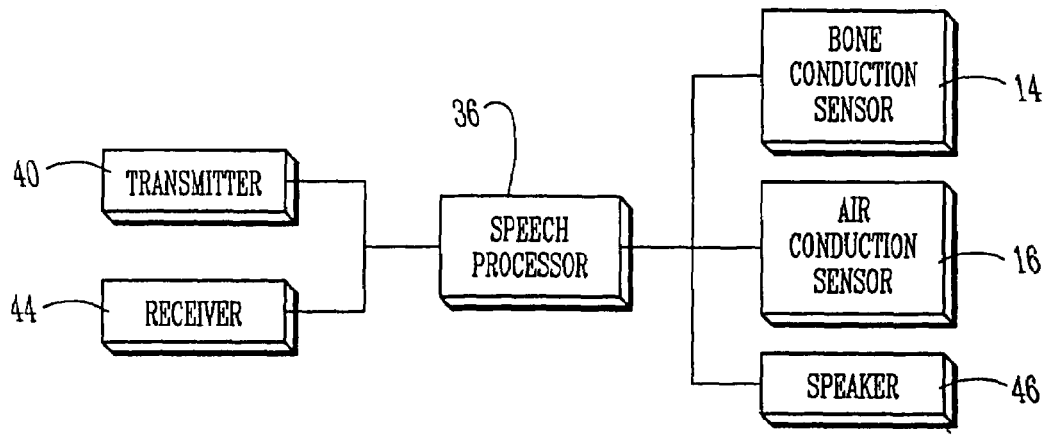
FIG. 3 is a block diagram of the voice sound transmitting unit of FIG. 1.

FIG. 3 shows in block diagram form the different components of the voice sound transmitting unit 10. It should be understood that the voice sound transmitting unit 10 as shown and previously described can also be easily modified to include a receiver 44 and speaker 46 to enable two-way communication.

It can be appreciated that the voice sound transmitting unit 10 of the present invention can be used in a multitude of different communications applications with different linkages. Such applications include, but are by no means limited to, transmitting voice sound information in Internet, Intranet, hard-wired local area network (LAN), wireless LAN, and telecommunications applications. In short, the voice sound transmitting unit 10 may be easily adapted for use in any computerized communications system to transmit voice sound information.

Of particular interest is the use of the voice sound transmitting unit 10 to enter voice sound information into a digital record stored on a computer. FIG. 4 is a diagram, showing the voice sound transmitting unit 10 as part of a larger wireless LAN 48 used for information systems processing. A wireless LAN, well known in the art, is a flexible data communications system generally implemented as an extension to, or as an alternative for, a wired LAN. Using radio frequency technology, wireless LANs transmit and receive data over the air, minimizing the need for wired connections. Thus, wireless LANs combine data connectivity with user mobility. Wireless LANs, such as those available from Proxim, Corp. and Breezecom perform well in applications using the voice sound transmitting unit 10.

A wireless LAN 48 is particularly well suited for use with a medical records information system. Health care professionals may use wireless workstations to enter patient information that is transmitted to a central server 50. Much of the patient information may be easily entered using a PEN based graphical user interface, wherein the user has a stylus to enter hand written information and also click push buttons, radio buttons, list boxes, etc. However, health care professionals will often want to dictate a portion of the patient information. With the systems available in the prior art, the health care professional must dictate onto a magnetic tape which is later transcribed by another individual and entered into the medical records system. The voice sound transmitting unit 10 of the present invention enables the user to populate digital records or fields of a database in real time.

Figure 5:
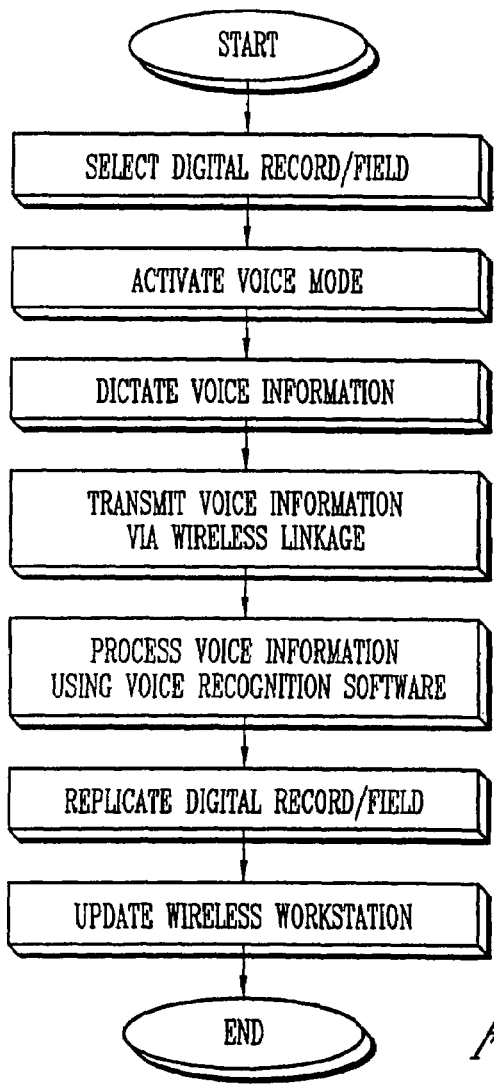
FIG. 5 is a flowchart of the preferred method for using the voice sound transmitting unit to enter data into a digital record or field.

FIG. 5 is a flowchart that illustrates how a user of the voice sound transmitting unit 10 of the present invention could enter data into a digital record. The user first selects on the wireless workstation 52 the field or record that is to be populated with alphanumeric strings. Next, the user activates the voice mode which sends a signal activating the voice sound transmitting unit 10. The user then utters the information for entry into the record. The voice signal is transmitted via the wireless linkage to a receiver 54 operatively connected to a workstation on the LAN 48 that has loaded a voice recognition software engine. Voice recognition software engines currently available include the Dragon Dictate from Dragon Systems and ViaVoice Profession provided by the IBM Corporation, respectively. The voice recognition software engine 56 receives and processes the voice signal, converting it into alphanumeric strings. Finally, a computer program populates the selected digital record with the alphanumeric string. Once the selected record has been populated on the server 50, the corresponding record or field on the user's workstation 52 may be updated. The user can then make any necessary corrections or defer any revisions until a later time. What is critical to the system is that the voice sound transmitting unit 10 deliver a high quality, pure voice signal for the voice recognition software engine to process.

It should be understood that the term "record" includes field, database or file.

From the foregoing, it can be seen that the present invention accomplishes at least all of its stated objectives.

What is claimed is:

1. A voice communication device for sensing voice sound information from a user, comprising:
    a one piece earpiece adapted to be inserted into an external auditory canal of the user;
    a fitting portion adapted to be fitted against contours of a wall of the external auditory canal while not contacting the external auditory canal along an opposite wall of the external auditory canal;
    a plurality of sensors disposed within the earpiece and within the external auditory canal of the user to sense vibrations;
    a transmitter operatively connected to the plurality of sensors and adapted to transmit sensed information to a remote location;
    a processor disposed within the earpiece and operatively connected to each of the plurality of sensors; and
    the earpiece being smaller in size then the interior of the external auditory canal whereby the earpiece does not block the canal.

2. The voice communication device of claim 1 further comprising a behind the ear portion connected to the earpiece.

3. The voice communication device of claim 1 wherein the fitting portion being adapted to be fit along the posterior superior wall of the external auditory canal.

4. The voice communication device of claim 1 wherein the transmitter is operatively connected to the processor.

5. The voice communication device of claim 4 further comprising a receiver and a speaker disposed within the earpiece, the receiver electrically connected to the speaker.

* * * * *